Aug. 13, 1935.  G. ZAPF  2,011,389
OIL FILLED CABLE INSTALLATION
Filed May 4, 1931  2 Sheets-Sheet 1

INVENTOR:
G. Zapf
BY Marks & Clerk
ATTYS

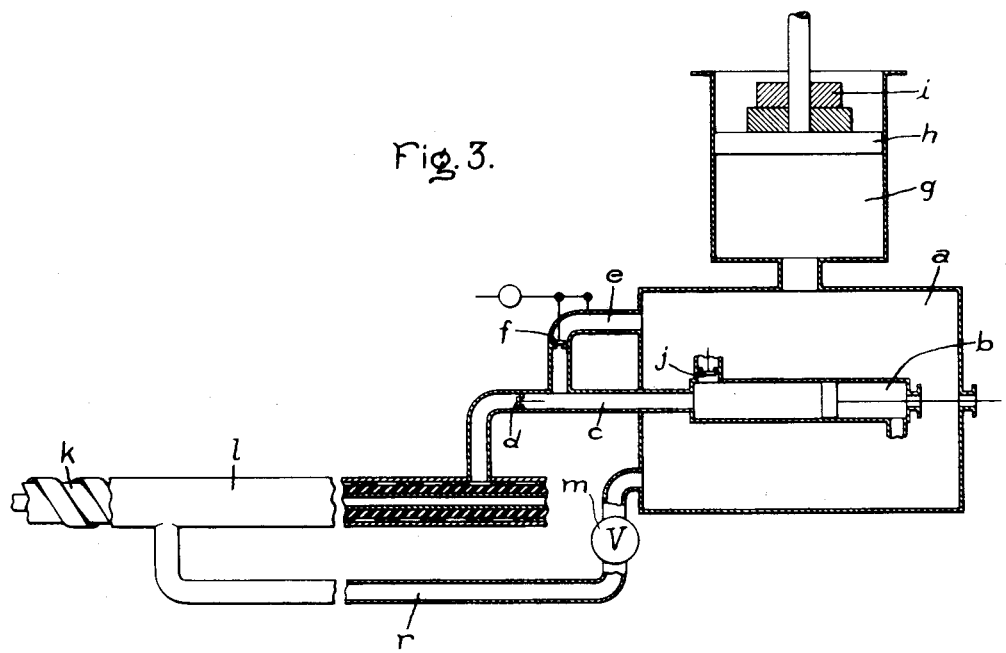

Patented Aug. 13, 1935

2,011,389

UNITED STATES PATENT OFFICE 2,011,389

OIL-FILLED CABLE INSTALLATION

Georg Zapf, Cologne, Germany, assignor to Felten & Guilleaume Carlswerk Actien-Gesellschaft, Cologne-Mulheim, Germany Application May 4, 1931, Serial No. 535,051
In Germany June 2, 1930

6 Claims. (Cl. 173—264)

This invention relates to an oil-filled cable installation in which use is made of a continuously working oil pump which is completely submerged in oil for the purpose of conveying the oil into the cable, the oil pump being provided in a closed storage container which is completely filled up with oil and which is connected to the oil supply pipes of the cable which enter into the container. In order to prevent a further delivery of oil into the cable and into the conveying pipes when the pump has produced a predetermined oil pressure, a non-return valve is provided in the oil supply pipe and a branch pipe is arranged between the said valve and the pump, which branch pipe is provided with a valve which is capable of being loaded to a variable extent and through which the oil leaving the pump flows back into the oil container when the non-return valve first referred to is closed. The non-return valve in the supply pipe serves to hold oil in the cable under pressure and prevent it from flowing back into the container when the valve in the branch pipe is open. Preferably the valves are mounted in parts of the oil pipes which lie outside the oil container.

Figure 1:
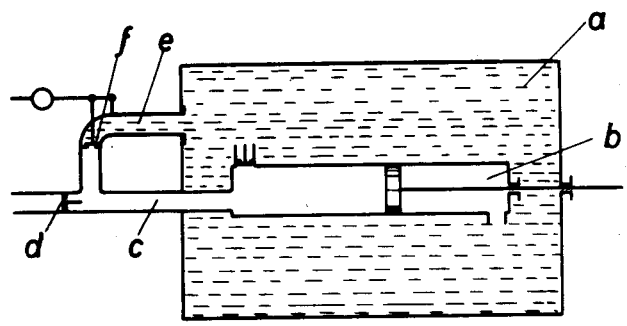
Figure 2:
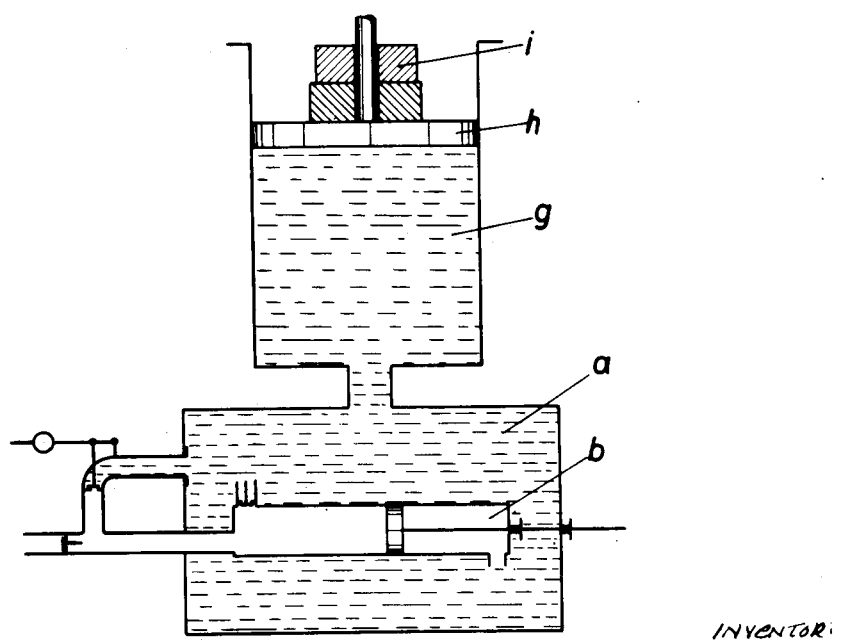

Figs. 1 and 2 of the accompanying drawings illustrate diagrammatically two forms of construction according to the invention.

Figure 3 illustrates an arrangement in which a pipe is used for returning the oil from the cable to the oil container.

Referring to Fig. 1, $a$ is a closed oil-filled container in which the oil pump $b$ is mounted. $c$ is the oil conveying pipe connected to the oil-filled cable and in which the non-return valve $d$ is mounted. Between the pump and the non-return valve, there is mounted outside the oil container an oil return pipe $e$ which is provided with a loaded valve $f$. Instead of the piston pump $b$ shown in this figure, by way of example, use may be made of a rotary pump such as a centrifugal or gear-driven pump.

In order to take the expansion of the oil into consideration, an oil storage container of the type known as a "weight accumulator" may be provided over the oil container which also serves to maintain positive pressure therein. Such an arrangement is illustrated in Fig. 2, in which $g$ is the storage container and $h$ the pressure piston, which is loaded with weights $i$ as desired. Such arrangements may be provided at the ends of the cable installation and at the junction sleeves.

Further, the arrangements hereinbefore described may also be used for draining the oil cable, in which case use is preferably made of a pipe for returning the oil from the cable to the oil container.

Such an arrangement is illustrated in Fig. 3 in which the same reference characters are used as in Figs. 1 and 2. In this figure, $k$ indicates a known type of cable comprising insulated conductor and an enclosure $l$. Oil is supplied to the cable by a pipe $c$ connected to the pump $b$, the latter having an inlet valve $j$. To the cable is connected a pipe $r$ which returns oil therefrom to the container $a$ through a valve $m$.

What I claim is:—

1. An oil-filled cable installation comprising in combination with a pipe through which the oil is fed to the cable, an oil pump which is capable of operating continuously, which oil pump is connected to the said pipe, a container completely filled with oil in which the said oil pump is mounted and with which the pump communicates and an oil container of the type of a weight accumulator provided above the oil-container in which the oil pump is mounted, the two containers being in communication with each other.

2. An oil filled cable installation comprising a cable, a pipe through which oil is supplied to the cable, a pump capable of continuous operation for supplying oil to the pipe, a container filled with oil in which the pump is so mounted as to receive oil therefrom, a branch pipe connected both to the supply pipe and to the container for returning oil to the latter, a valve in the branch pipe capable of being loaded to any desired extent, a non-return valve in the supply pipe on the cable side of the branch pipe to prevent return of oil from the cable to the container when the valve in the branch pipe is open, and an oil storage container of the weight accumulator type in free communication with the first mentioned container for maintaining a positive pressure therein.

3. A cable installation comprising an insulated conductor, a filling of oil for the cable, a closed container completely filled with the same kind of oil that is in the cable, a pump submerged in the oil in the container to prevent the admission of air thereto and receiving its supply therefrom, a pipe receiving oil from the pump and delivering it to the cable, and an accumulator of the weighted type connected to the pump container to maintain it filled with oil under a determined pressure.

4. A cable installation comprising an insulated conductor, a filling of oil for the cable, a closed container completely filled with the same kind of oil that is in the cable, a pump submerged in the oil in the container and receiving its supply of oil therefrom, a pipe receiving oil from the pump and delivering it to the cable, a non-return valve in the pipe, a means on the inlet side of the non-return valve, responsive to pressure for regulating the delivery of oil from the pump to the cable, and a means for maintaining the container filled with oil.

5. A cable installation comprising an insulated conductor having an enclosure, a filling of oil for the cable, a container containing a supply of oil for the cable, a pump within the container and submerged in the oil therein to prevent the admission of air thereto, a pipe receiving oil from the pump and supplying it to the cable, a second pipe connected both to the cable and the container for returning oil to the container, means controlling the supply of oil from the pump to the cable, and valve means located between the cable and the container to prevent return of oil from the cable to the container when the supply of oil from the pump to the cable is interrupted.

6. A cable installation comprising a cable, a filling of oil for the cable, a container containing a supply of oil for the cable, a pump located within the container and submerged in the oil therein to prevent the admission of air thereto and receiving its supply therefrom, a pipe receiving oil from the pump and supplying it to the cable, a non-return valve in the pipe to prevent the cable from returning oil to the container, a branch pipe connected to the pipe on the inlet side of said valve and to the container, a weighted valve in the branch pipe, a return pipe connected to the cable and to the container for returning oil from the former to the latter, and an accumulator in free communication with the container to maintain a positive pressure on the oil in the container and to compensate for any increase in volume of the oil due to heating thereof.

GEORG ZAPF.